(12) United States Patent
Henderson

(10) Patent No.: US 12,474,488 B2
(45) Date of Patent: Nov. 18, 2025

(54) TERRAIN REFERENCED NAVIGATION SYSTEM

(71) Applicant: Atlantic Inertial Systems Limited, Plymouth (GB)

(72) Inventor: Geoffrey Henderson, Yelverton (GB)

(73) Assignee: ATLANTIC INERTIAL SYSTEMS LIMITED, Plymouth (GB)

( * ) Notice: Subject to any disclaimer, the term of this patent is extended or adjusted under 35 U.S.C. 154(b) by 658 days.

(21) Appl. No.: 17/506,891

(22) Filed: Oct. 21, 2021

(65) Prior Publication Data
US 2022/0128711 A1    Apr. 28, 2022

(30) Foreign Application Priority Data
Oct. 23, 2020   (EP) .................................... 20275163

(51) Int. Cl.
*G01S 19/49*     (2010.01)
*G01C 21/00*     (2006.01)
(Continued)

(52) U.S. Cl.
CPC .......... *G01S 19/49* (2013.01); *G01C 21/3461* (2013.01); *G01S 13/931* (2013.01)

(58) Field of Classification Search
CPC ... G01S 19/49; G01S 13/931; G01C 21/3461; G01C 21/005; G01C 21/165;
(Continued)

(56) References Cited
U.S. PATENT DOCUMENTS
4,507,737 A    3/1985  LaSarge et al.
5,574,649 A *  11/1996 Levy ...................... G01C 21/30
                                                    73/146
(Continued)

FOREIGN PATENT DOCUMENTS
CN    105547300 A    5/2016
DE    3439000 A1    4/1986
(Continued)

OTHER PUBLICATIONS
Japanese Decision to Grant; Application No. 2021-172772; mailed Mar. 11, 2025, with machine translation, 6 pages.
(Continued)

*Primary Examiner* — Adam R Mott
*Assistant Examiner* — Byron Xavier Kasper
(74) *Attorney, Agent, or Firm* — CANTOR COLBURN LLP

(57) ABSTRACT

A ground vehicle navigation system includes an inertial navigation system arranged to output an orientation estimate of the ground vehicle and a first position estimate of the ground vehicle, a terrain map comprising terrain data, a terrain gradient based navigation unit arranged to output a second position estimate of the ground vehicle based on a comparison between the orientation estimate and terrain gradient data extracted from the terrain map and an iterative algorithm unit arranged to determine a system error state in each iteration. In each iteration the iterative algorithm unit is arranged to receive the first position estimate and the second position estimate; and update the system error state for the next iteration based on the system error state, the first position estimate and the second position estimate. The iterative algorithm unit may then apply the updated system error state to the INS measurements.

17 Claims, 3 Drawing Sheets

(51) Int. Cl.
*G01C 21/16* (2006.01)
*G01C 21/18* (2006.01)
*G01C 21/34* (2006.01)
*G01S 13/931* (2020.01)

(58) Field of Classification Search
CPC .............. G01C 21/3826; G01C 21/18; G01C 21/3848; G01C 21/3859; G01C 17/00; G01C 19/00; G01C 19/005; G01C 21/188; G01C 21/04; B64C 2201/141; B64C 2201/10; B60G 2401/16; B60G 2800/019; B60G 2800/702; B60W 2552/05; B60W 2552/15; B60W 40/076
See application file for complete search history.

(56) References Cited

U.S. PATENT DOCUMENTS

| | | | |
|---|---|---|---|
| 5,912,643 | A | 6/1999 | Chew et al. |
| 6,366,835 | B1 | 4/2002 | Henderson |
| 2002/0165669 | A1 | 11/2002 | Pinto et al. |
| 2005/0021229 | A1 | 1/2005 | Lee et al. |
| 2007/0032951 | A1 | 2/2007 | Tanenhaus et al. |
| 2010/0324752 | A1 | 12/2010 | Suganuma et al. |
| 2011/0015817 | A1 | 1/2011 | Reeve |
| 2011/0106450 | A1* | 5/2011 | Toda ................ G01S 19/49 701/472 |
| 2013/0024090 | A1* | 1/2013 | Minase ............. F02D 29/02 701/102 |
| 2016/0146616 | A1* | 5/2016 | Ren ................. G01C 21/165 701/409 |
| 2016/0377437 | A1* | 12/2016 | Brannstrom ........ G05D 1/0274 701/501 |
| 2017/0177958 | A1* | 6/2017 | Yamanoi ............ G06V 20/588 |
| 2017/0372514 | A1* | 12/2017 | Grufman ........... G05D 1/0278 |
| 2018/0128616 | A1* | 5/2018 | Malvern ........... G01C 21/1652 |
| 2019/0129435 | A1* | 5/2019 | Madsen ............. A01B 69/008 |
| 2019/0299966 | A1* | 10/2019 | Dumble ............. B60W 10/22 |
| 2020/0025571 | A1 | 1/2020 | Skilton et al. |
| 2020/0039522 | A1* | 2/2020 | Nakaoka ........... B60W 30/02 |
| 2020/0393566 | A1* | 12/2020 | Zeng ................ G01S 7/4808 |
| 2021/0003396 | A1* | 1/2021 | Destelle ............ G06F 17/12 |

FOREIGN PATENT DOCUMENTS

| | | |
|---|---|---|
| EP | 1475609 A2 | 11/2004 |
| JP | H08247777 A | 9/1996 |
| JP | H09292248 A | 11/1997 |
| JP | 2008087719 A | 4/2008 |
| JP | 2009236532 A | 10/2009 |
| JP | 2011226950 A | 11/2011 |
| JP | 2012037301 A | 2/2012 |
| JP | 2013044558 A | 3/2013 |
| JP | 2015083930 A | 4/2015 |
| JP | 2019075176 A | 5/2019 |
| WO | 2019115981 A1 | 6/2019 |

OTHER PUBLICATIONS

Extended European Search Report for International Application No. 20275163.2 dated Apr. 1, 21021, 5 pages.
Translation of EP1475609A1, 11 pgs.

* cited by examiner

TERRAIN REFERENCED NAVIGATION SYSTEM

CROSS-REFERENCE TO RELATED APPLICATIONS

This application claims priority to European Patent Application No. 20275163.2 filed Oct. 23, 2020, the entire contents of which is incorporated herein in its entirety.

TECHNICAL FIELD

The present disclosure relates to the field of navigation systems, specifically navigation systems for use on ground vehicles.

BACKGROUND

Terrain Referenced Navigation (TRN) systems are in service on a number of airborne platforms and integrate aircraft navigation data, radar altimeter data and stored terrain elevation data in order to generate a navigation solution. TRN systems are often used in conjunction with Inertial Navigation Systems (INS), which use inertial measurement sensors (e.g. gyroscopes, accelerometers, etc.) to provide a navigation solution. Such systems are sometimes referred to as Inertial Reference Units (IRUs). The navigation solutions often use INS error calibrating Kalman Filters as a means of integrating the navigation solutions provided by the TRN and the INS.

Position estimates obtained from Inertial Navigation Systems typically drift at a rate of around 2 nautical miles per hour due to the accumulation of errors caused by accelerometers and gyroscopes over time. Navigation systems are able to correct for these errors, to an extent, by using further sources of position estimates, including satellite-based navigation solutions such as GPS, GNSS, etc. However, satellite-based navigation solutions are not reliable: signals can be jammed, spoofed, blocked, etc. which can lead to problems with navigation systems that rely too heavily on these satellite-based navigation solutions. TRN systems offer a further navigation solution that can allow navigation systems to correct for INS errors over time.

Conventional TRN systems utilise Barometric-Inertial mixed altitude and radar altimeters in order to estimate terrain elevation beneath an aircraft. Measured terrain elevation estimates are then correlated with stored terrain elevation data along the aircraft's travel path in order to produce a navigation solution—i.e. estimate the position of the aircraft.

SUMMARY

When viewed from a first aspect this disclosure provides a ground vehicle navigation system comprising: an inertial navigation system arranged to output an orientation estimate of the ground vehicle and a first position estimate of the ground vehicle; a terrain map comprising terrain data; a terrain gradient based navigation unit arranged to output a second position estimate of the ground vehicle based on a comparison between the orientation estimate and terrain gradient data extracted from the terrain map; and an iterative algorithm unit arranged to determine a system error state in each iteration; wherein in each iteration the iterative algorithm unit is arranged to: receive the first position estimate and the second position estimate; and update the system error state for the next iteration based on the system error state, the first position estimate and the second position estimate. The iterative algorithm unit may then apply the updated system error state to the INS measurements in order to calculate a more accurate, current estimate of the position of the ground vehicle.

In most circumstances, ground vehicles have all wheels/tracks/etc. in contact with the ground. This being the case, the orientation of a ground vehicle at any given time is indicative of the gradient of the ground beneath the vehicle at that time (which is not the case for aircraft). For example, in circumstances where ground vehicles are positioned on a slope, the vehicle itself will typically be oriented at an angle equal to, or substantially similar to, the angle of the slope beneath it. This provides a possible navigation solution: the orientation of a vehicle, as measured by an inertial measurement unit (IMU), can be compared instantaneously, or over time with known (e.g. stored) terrain gradient data in order to provide an estimate of the vehicle's position. In a set of examples, the terrain gradient based navigation unit is arranged to determine the second position estimate based on a correlation between measured orientation estimates and terrain gradient data extracted from the terrain map. In a set of examples, the terrain gradient based navigation unit is arranged to determine the second position estimate based on a correlation between a track of a plurality of measured orientation estimates taken over a period of time and/or space, and terrain gradient data extracted from the terrain map.

As used herein, the term orientation is used to describe a three-dimensional angular orientation of an object with respect to a fixed reference direction, and the term attitude is used to describe a two-dimensional angular orientation of an object with respect to a fixed reference plane. For example, an orientation of a ground vehicle may comprise a measurement of the vehicle's pitch, roll and yaw, and an attitude of a ground vehicle may comprise a measurement of the vehicle's pitch and roll. During on-road navigation, measurements of a vehicle's pitch may prove more useful for comparing with terrain gradient data extracted from the terrain map than measurements of the vehicle's roll, as roads tend to be dug into the side of hills so as to provide a flat road surface (zero roll). During off-road navigation, measurements of both a vehicle's pitch and roll may prove equally useful for comparing with terrain gradient data extracted from the terrain map.

Comparing orientation measurements with terrain gradient data in this way provides a further navigation solution that may be used to correct for INS drift, without requiring external references. For example it may be used in environments where satellite-based navigation systems cannot be used (e.g. due to a lack of signal, GPS signals being spoofed/jammed, etc.). An additional benefit is that no signals are emitted as part of the process which means not revealing the presence of the vehicle in question as well as not interfering with other local systems. Additionally, the equipment (e.g. antennas) required to use radio/optical based navigation solutions may increase the radar cross-section of a vehicle, making it more detectable by radar. Whilst current INS are able to provide a reasonable estimate of a vehicle's position over time, these are not drift free and high-end systems can cost upwards of $50 k. The system of the present disclosure may be used with such systems for further improved navigation. However, in some examples the present disclosure enables the use of cheaper, less accurate INS with greater levels of drift, as the drift of these cheaper systems can be counteracted using the terrain gradient based navigation system disclosed herein. In some examples, the INS comprises at least one microelectromechanical systems accelerometer or gyroscope. In a set of examples, the INS comprises three accelerometers with orthogonal sensing axes, and three gyroscopes with orthogonal sensing axes. In some examples the terrain gradient matching process may be used without an INS, but with a sensor capable of measuring distance travelled—e.g. an odometer. In such cases, gyroscopes or inclinometers would be sufficient to establish the orientation of the vehicle, without requiring accelerometers. However, as gyroscopes are often available in a cost efficient manner together with accelerometers in an IMU, the addition of an INS for added navigational accuracy is likely to be attractive.

In a set of examples, the terrain map comprises terrain elevation data. The terrain map may comprise an array of map posts (i.e. individual terrain location data points), each map post comprising data indicative of terrain elevation at a specific position (e.g. latitude and longitude). Terrain elevation data of this type is commonplace, and typically readily available (e.g. as provided according to the Digital Terrain Elevation Data (DTED) standard). In some examples, each map post of the terrain map comprises terrain elevation data for an area of less than 40000 m$^2$ (e.g. 200 m by 200 m) on the Earth's surface, preferably an area of less than 10000 m$^2$ (e.g. 100 m by 100 m), more preferably an area of less than 2500 m$^2$ (e.g. 50 m by 50 m), yet more preferably an area of less than 1000 m$^2$ (e.g. 30 m by 30 m). It will be appreciated that higher resolution data allows for a better potential correlation, but adds to the computational processing requirements.

In a set of examples, the navigation system comprises a terrain gradient calculation unit arranged to calculate the terrain gradient data from the terrain elevation data stored in the terrain map. The terrain gradient calculation unit may apply a six-term, two-dimensional plane fit to the map posts of the terrain map in order to calculate terrain gradient data. This plane fit may be applied in advance in order to generate and store a terrain gradient map comprising terrain gradient data which can be used by the terrain gradient-based navigation unit directly in order to estimate the position of the vehicle, or the plane fit may be applied dynamically from the digital terrain elevation data in the terrain map for a region surrounding the current estimated position of the vehicle. The calculated terrain gradient data may comprise gradients and/or rate of change of gradients, and the terrain gradient data may be continually recalculated in the area of the current estimated position of the vehicle in order to keep the data appropriate to the current measurement. The area over which terrain gradient data is calculated may increase as the estimated uncertainty in the current estimated position of the vehicle increases. The region for which terrain gradient data is calculated dynamically may be updated regularly as the vehicle moves (and therefore as its position changes) so as to make sure terrain gradient data is available for all areas into which the vehicle may move from its current estimated position The region for which terrain gradient data is calculated dynamically may comprise a region of less than 10 square kilometres, or less than 5 square kilometres, or less than 3 square kilometres, or less than 1 square kilometre. In a set of embodiments, the area for which terrain gradient data is calculated is a substantially circular area with a radius equal to three times the current estimated uncertainty in the current navigation solution. There may be a lower limit on the area for which terrain gradient data is calculated so as to ensure that a sufficient amount of terrain elevation data is used to calculate the terrain gradient data at any one time.

In a set of examples, the iterative algorithm unit is arranged to further update the system error state based on an observation that ground vehicles are expected not to travel (at least not at a significant speed) in a direction perpendicular relative to the fore/aft direction of the vehicle (i.e. they will not generally move in these directions unless they slide or become airborne). This enables the iterative algorithm unit to discount to some extent sensor readings that indicate otherwise. For example, if accelerometer readings suggest that the vehicle is moving perpendicular to its fore/aft direction (i.e. the direction it is facing, the iterative algorithm unit may take this into account when updating the system error state. In some examples the iterative algorithm unit is arranged to increase an uncertainty associated with the first position estimate when INS measurements indicate motion of the ground vehicle perpendicular to the fore/aft direction of the vehicle when updating the system error state. This observation may help reduce the drift of the position estimates obtained from the INS, as it provides a further correction to reduce INS drift along an axis perpendicular to the fore/aft direction of the vehicle.

In a set of examples, the orientation estimate output by the INS may comprise estimates of the vehicle's pitch, roll and yaw, from which an attitude estimate comprising the vehicle's pitch and roll may be obtained. The terrain gradient based navigation unit may then be used to calculate an attitude estimate (comprising pitch and roll estimates) that would be expected if the vehicle were at a given location, given the estimated heading of the vehicle as given by the yaw estimate. The terrain gradient based navigation unit may then compare attitude estimates (i.e. pitch and roll estimates) obtained from the INS with the terrain gradient data.

In a set of examples, the iterative algorithm unit comprises the terrain gradient based navigation unit. The iterative algorithm unit may also comprise the inertial navigation system. For example, the iterative algorithm unit may comprise a processor and a memory, and the same processor and memory may be used for the terrain gradient based navigation unit and the inertial navigation system. The iterative algorithm unit may comprise a Kalman filter.

When viewed from a second aspect this disclosure provides an iterative method of determining an system error state for a ground vehicle, each iteration of the method comprising: receiving a position estimate and an orientation estimate from an inertial navigation system; receiving a second position estimate from a terrain gradient based navigation unit, the second position estimate being based on a comparison between the orientation estimate and terrain gradient data extracted from a terrain map comprising terrain data; and updating the system error state for the next iteration based on the system error state, the first position estimate and the second position estimate.

It will be appreciated that all of the optional features discussed above in relation to the first aspect of the disclosure are also applicable to this second aspect.

DETAILED DESCRIPTION OF THE DRAWINGS

Figure 1:
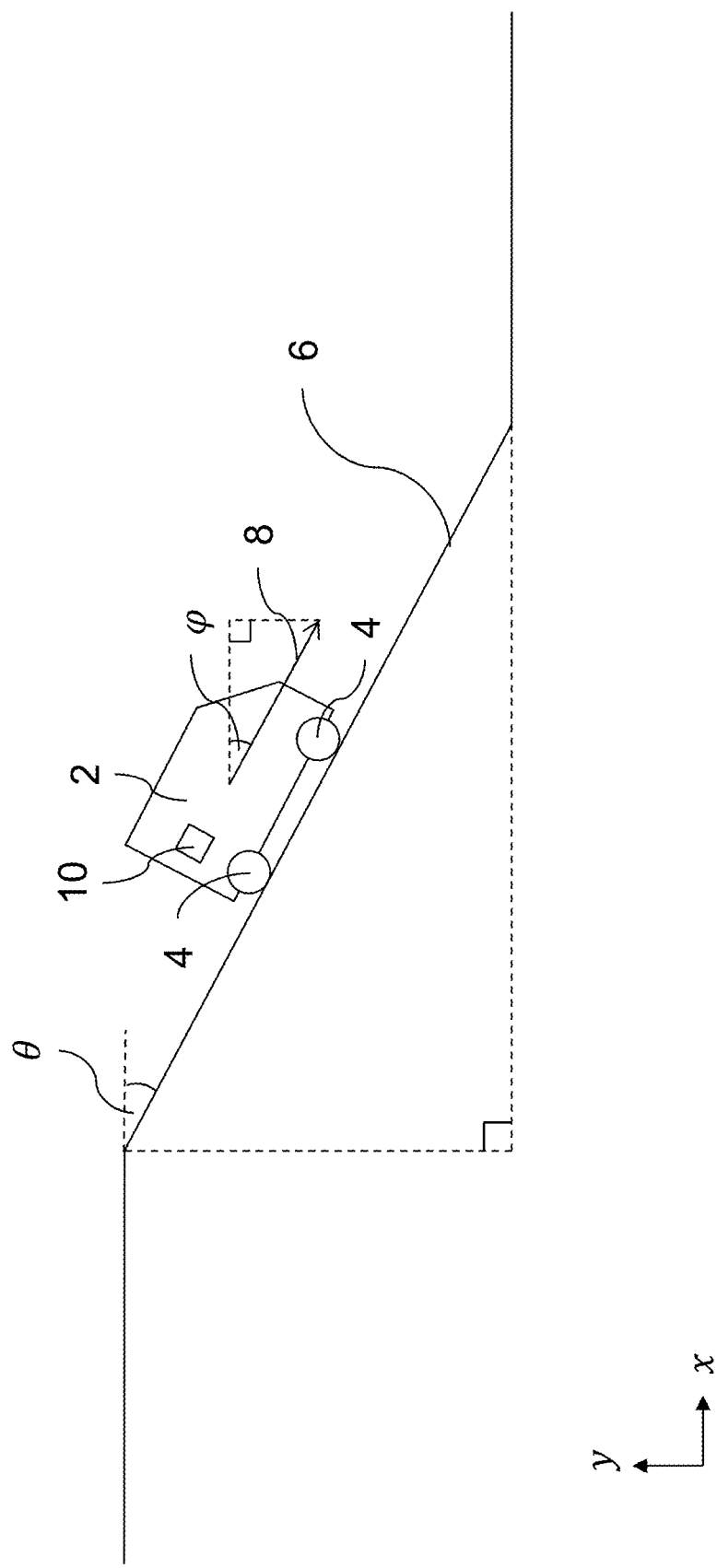
FIG. 1 shows a vehicle on a slope.

FIG. 1 shows a ground vehicle 2 travelling on terrain 6. It can be seen that the vehicle 2 is currently on a sloped part of the terrain 6 which is inclined at an angle θ to the horizontal. The vehicle 2 has wheels 4 (although in other examples it could have tracks or skis/runners) which are in contact with the terrain 6. As the vehicle is in contact with the terrain 6, its own angle φ to the horizontal corresponds to the angle of the terrain 6. Vector 8 which indicates the forward propagation direction of the vehicle (i.e. the direction in which it moves) remains substantially parallel to the surface of the terrain 6. Thus while the wheels 4 remain in contact with the terrain 6, the orientation of the vehicle will follow the orientation (i.e. the gradient) of the terrain 6. Vehicle 2 is fitted with a ground-based navigation system 10 which will be described in more detail with reference to FIGS. 2 and 3.

Figure 2:
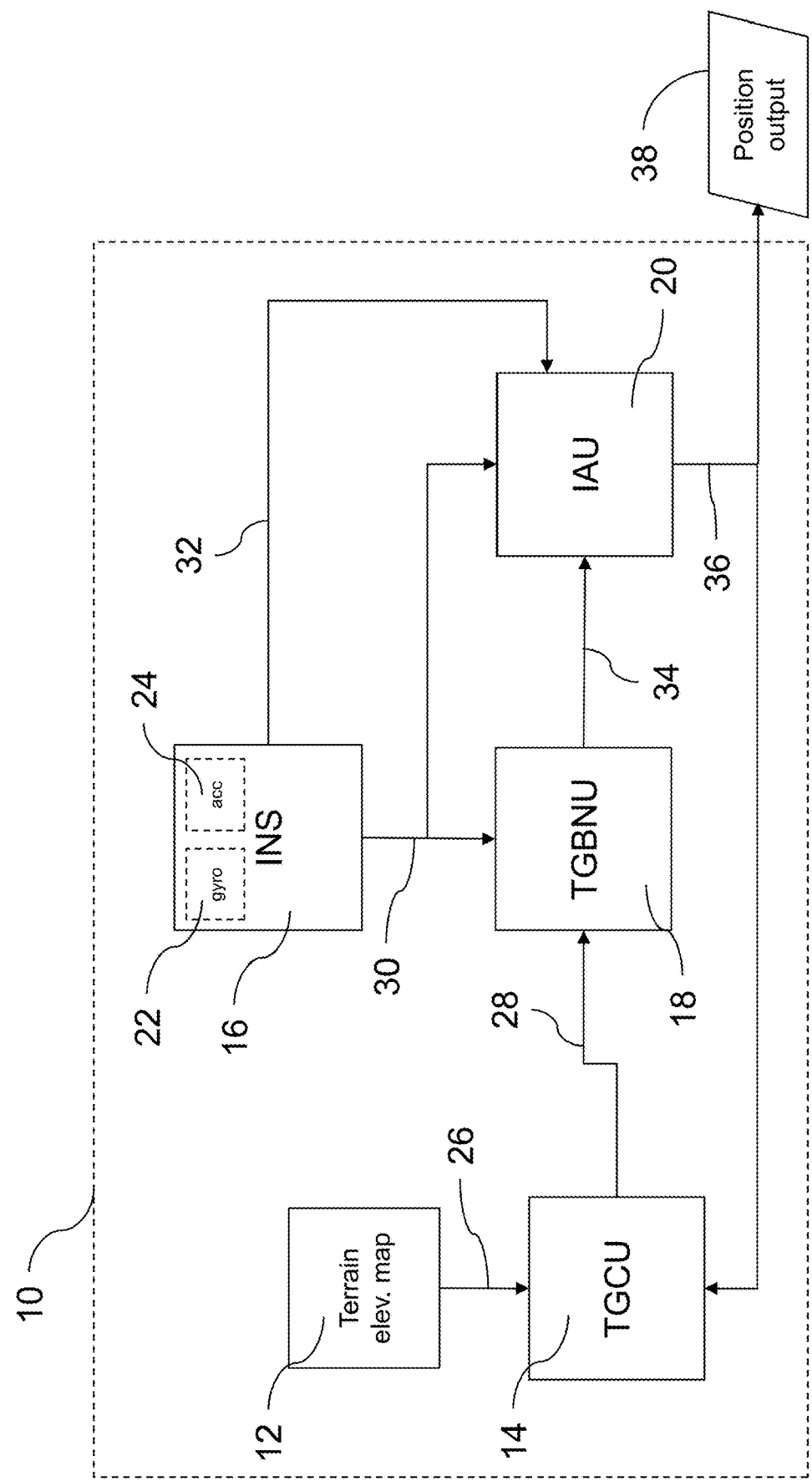
FIG. 2 shows an example of a system for terrain gradient based navigation.

FIG. 2 shows a ground-based navigation system 10 which includes various components such as a terrain elevation map 12, a terrain gradient calculation unit 14, an inertial navigation system 16, a terrain gradient based navigation unit 18 and an iterative algorithm unit (e.g. a Kalman filter) 20. It will be appreciated that these various components may be implemented separately on separate processors or they may all be implemented as part of a single system, e.g. running on a single processor with shared resources.

The inertial navigation system 16 comprises three orthogonal accelerometers 24 which provide three dimensional acceleration data for the vehicle 2 and three orthogonal gyroscopes 22 which provide three dimensional rotation information for the vehicle 2. The accelerometers 24 and gyroscopes 22 may be part of an inertial measurement unit which may be a standalone component. In some examples the inertial navigation system 16 is a strapdown inertial navigation system in which the accelerometers and gyroscopes are fixed in orientation relative to the vehicle 2 so that accelerations and rotations of the vehicle 2 give corresponding acceleration and rotation measurements in the accelerometers 24 and gyroscopes 22. The inertial navigation system 16 integrates the outputs of accelerometers 24 to calculate velocity and position of the vehicle 2 and integrates the outputs of gyroscopes 22 to calculate the orientation of the vehicle 2. The accelerometer data 32 (including position and velocity) is provided to the iterative algorithm unit 20 so as to provide a first estimate of vehicle position. Additionally, the orientation data 30 is also provided to the iterative algorithm unit 20.

Terrain gradient based navigation unit 18 receives the accelerometer data 30, including an estimate of the current position of the vehicle 2. The terrain gradient based navigation unit 18 receives the orientation data 30 indicating the current orientation of the vehicle 2 and also receives local terrain gradient data 28 from terrain gradient calculation unit 14. Terrain gradient calculation unit 14 receives a current derived position estimate 36 from the iterative algorithm unit 20 (indicating the best estimate of the vehicle's current position) and acquires a cache of local terrain elevation data 26 from terrain elevation map 12 for an area surrounding the derived position estimate 36 and calculates a map of terrain gradients from that terrain elevation data 26. The terrain gradient data may be calculated using a six-term, two-dimensional plane fit of the terrain elevation data. In some examples the terrain gradient data further comprises rates of change of gradients for additional correlation processing. The terrain gradient based navigation unit 18 then performs a correlation process to match the orientation of the vehicle 2 with the terrain gradient data 28 to estimate a position of the vehicle 2 that correlates with the terrain gradient data 28. This may be a single data point comparison (i.e. to determine a point at which the terrain gradient data 28 matches the current orientation of the vehicle) but is preferably a multipoint comparison based on a history of orientations of the vehicle 2 (i.e. correlating the vehicle's recent orientation profile with the terrain gradient data 28). The terrain gradient based navigation unit 18 then outputs a second position estimate 34 based on the correlation process. The second position estimate provides an additional positon estimate to the iterative algorithm unit 20 alongside the INS position estimate 32. The iterative algorithm unit 20 can use both position estimates to improve its overall estimate of the position of the vehicle 2 (i.e. the derived position estimate 36).

Terrain elevation map 12 may be a database of terrain elevation data 26 for a large area. The area may be a selected area of the Earth's surface over which the vehicle 2 expects to travel. The area may be a whole country or the whole world (depending on the resolution of the data and the available storage capacity). Terrain elevations are typically stored as discrete map posts, each corresponding to a spot height at a given position on the Earth's surface. The resolution of the data may be varied by varying the distance between map posts. For example in some typical terrain maps the map posts are 30 metres apart and arranged in a rectangular grid. It will be appreciated that other shapes of grids or arrangements of map posts or indeed other methods of storing terrain data may also be used.

The iterative algorithm unit 20 takes all of its inputs 30, 32, 34 and processes them together with a stored system state (including the last derived position estimate 36) to produce a new position estimate 36. The iterative algorithm unit 20 may take any suitable form, but in some examples is a least squares estimator. In some examples the iterative algorithm unit 20 is a Kalman filter. The Kalman filter contains a predictive model which predicts a next state based on current information and merges that with new measurements (such as the first and second position estimates 32, 34 and orientation information 30) to produce a new estimate of the system state.

In some examples, the iterative algorithm unit 20 may receive an observation (or measurement) that the velocity of the vehicle 2 perpendicular to its fore/aft direction is zero. This may be either the horizontal (left/right) velocity or the vertical (top/bottom) velocity or both. This tells the iterative algorithm that any changes seen in those state variables are more likely to be due to other errors. The iterative algorithm unit is thus arranged to increase an uncertainty associated with the first position estimate 32 and/or second position estimate 34 when INS measurements indicate a significant component of velocity perpendicular to the fore/aft direction of the vehicle when updating the system error state.

The derived position estimate 36 may also be output externally as position output 38 which may be used by vehicle navigation systems, e.g. provided on a vehicle display or provided to a vehicle autopilot and/or other vehicle systems.

Figure 3:
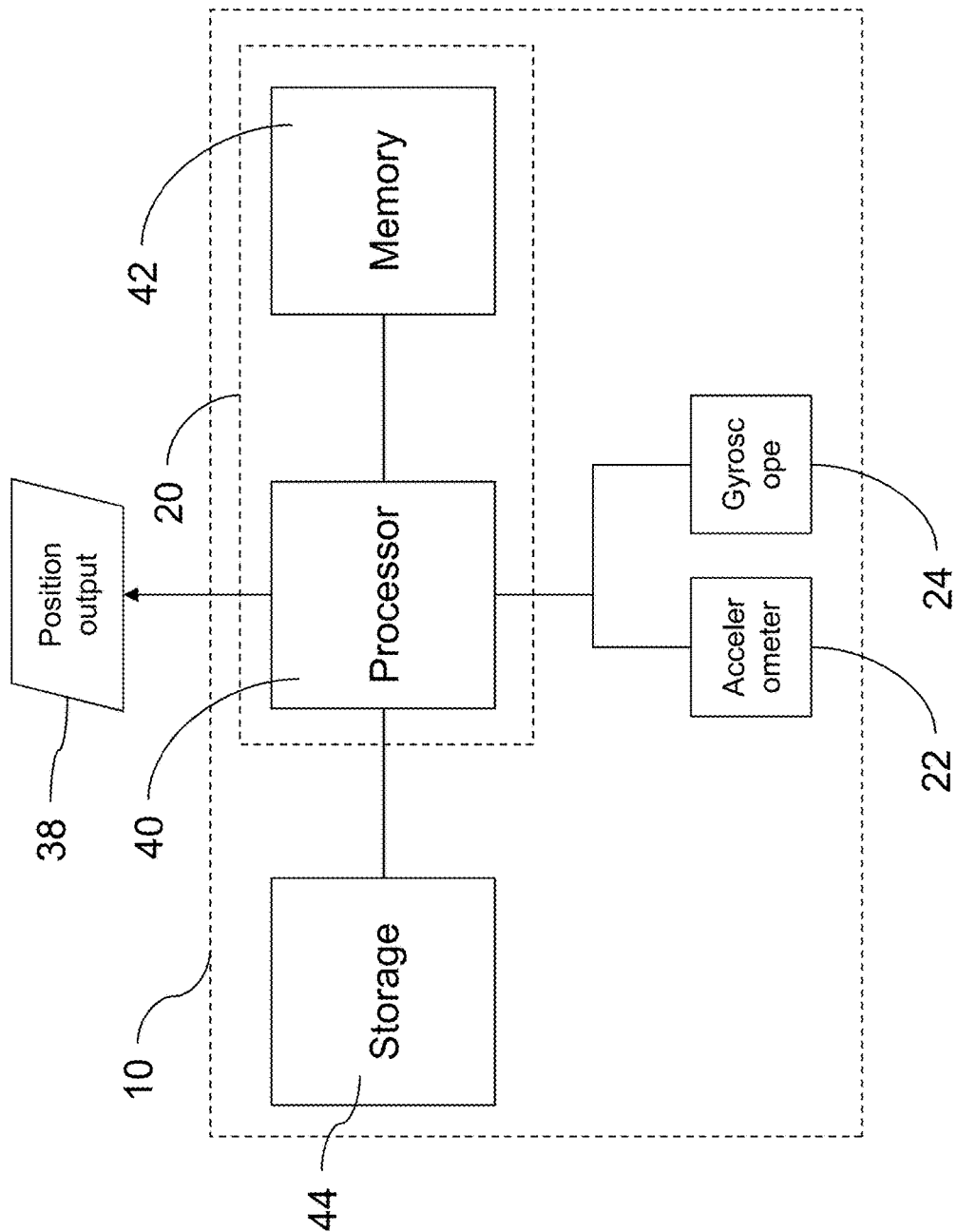
FIG. 3 shows an example of system hardware.

FIG. 3 shows hardware that may be used to implement the system of FIG. 2. FIG. 3 shows a navigation system 10 that includes a processor 40, memory 42 and storage 44. It will be appreciated that in some examples memory 42 may suffice without additional storage 44, but the size of maps involved will normally require the provision of significant storage and is therefore not cost-effective in random access memory 42. Storage 44 may be a hard disk or solid state disk or the like capable of storing large quantities of map data. Additionally, the navigation system 10 includes accelerometers 22 and gyroscopes 24. Although only one of each is shown in FIG. 3, it will be appreciated that multiple such sensors may be used, in particular three mutually orthogonal accelerometers and gyroscopes may be provided. The processing of the INS 16 and the terrain gradient based navigation unit 18 and the terrain gradient calculating device 14 and the iterative algorithm unit 20 may all run on the same processor 40 (which may be a CPU or FPGA or the like). However, in some examples different processors may be used for different parts of the system 10.

It will be appreciated by those skilled in the art that the disclosure has been illustrated by describing one or more specific examples thereof, but is not limited to these examples; many variations and modifications are possible, within the scope of the accompanying claims.

The invention claimed is:

1. A ground vehicle navigation system comprising:
   an inertial navigation system arranged to output an orientation estimate of the ground vehicle and a first position estimate of the ground vehicle;
   a terrain map comprising terrain data;
   a terrain gradient based navigation unit arranged to output on a display a second position estimate of the ground vehicle based on a comparison between the orientation estimate and terrain gradient data extracted from the terrain map; and
   an iterative algorithm unit arranged to determine a system error state in each iteration;
   wherein in each iteration the iterative algorithm unit is arranged to:
   receive the first position estimate and the second position estimate; and
   dynamically updating the system error state for the next iteration based on the system error state, the first position estimate and the second position estimate;
   wherein the iterative algorithm unit is arranged to further update the system error state based on an observation that ground vehicles are expected not to travel in a direction perpendicular relative to the fore/aft direction of the vehicle;
   wherein the iterative algorithm unit increases an uncertainty associated with the first position estimate when inertial navigation system measurements indicate a significant component of velocity perpendicular to the fore/aft direction of the vehicle when updating the system error state, wherein the uncertainty is applied to information related to accelerometer readings.

2. The navigation system of claim 1, wherein the terrain gradient based navigation unit is arranged to determine the second position estimate based on a correlation between measured orientation estimates and terrain gradient data extracted from the terrain map.

3. The navigation system of claim 1, wherein the terrain gradient based navigation unit is arranged to determine the second position estimate based on a correlation between a track of a plurality of measured orientation estimates, taken over a period of time, and terrain gradient data extracted from the terrain map.

4. The navigation system of claim 1, wherein the terrain map comprises terrain elevation data, and the navigation system further comprises a terrain gradient calculation unit arranged to calculate the terrain gradient data from the terrain elevation data.

5. The navigation system of claim 4, wherein the terrain gradient data comprises gradients and/or rate of change of gradients.

6. The navigation system of claim 4, wherein the terrain gradient data is calculated in advance from the terrain elevation data and stored as a terrain gradient map.

7. The navigation system of claim 4, wherein the terrain gradient data is continually recalculated for an area surrounding the current estimated position of the vehicle.

8. The navigation system of claim 7, wherein the area for which the terrain gradient data is continually recalculated increases as the estimated uncertainty in the current estimated position of the vehicle increases.

9. The navigation system of claim 8, wherein the navigation system applies a lower limit to the area for which the terrain gradient data is continually recalculated.

10. The navigation system of claim 1, wherein the orientation estimate comprises a pitch, roll and yaw estimate, and the terrain gradient based navigation unit is arranged to compare the measured pitch and roll estimates with the terrain gradient data.

11. The navigation system of claim 10, wherein the inertial navigation system comprises at least one microelectromechanical systems accelerometer or gyroscope.

12. The navigation system of claim 1, wherein the iterative algorithm unit comprises the terrain gradient based navigation unit.

13. The navigation system of claim 1 wherein the iterative algorithm unit comprises a Kalman filter.

14. An iterative method of determining an system error state for a ground vehicle, each iteration of the method comprising:
    receiving a position estimate and an orientation estimate from an inertial navigation system;
    receiving a second position estimate from a terrain gradient based navigation unit, the second position estimate being based on a comparison between the orientation estimate and terrain gradient data extracted from a terrain map comprising terrain data;
    displaying the second position estimate on the gradient based navigation unit;
    dynamically updating the system error state for the next iteration based on the system error state, the first position estimate and the second position estimate; and
    further updating the system error state based on an observation that ground vehicles are expected not to travel in a direction perpendicular relative to the fore/aft direction of the vehicle;
    wherein the iterative algorithm unit increases an uncertainty associated with the first position estimate when inertial navigation system measurements indicate a significant component of velocity perpendicular to the fore/aft direction of the vehicle when updating the system error state, wherein the uncertainty is applied to information related to accelerometer readings.

15. The navigation system of claim 5, wherein the terrain gradient data is calculated using a six-term, two-dimensional plane fit of the terrain elevation data.

16. The navigation system of claim 11, wherein the inertial navigation system comprises three accelerometers with orthogonal sensing axes and three gyroscopes with orthogonal sensing axes.

17. The navigation system of claim 11, wherein the inertial navigation system comprises an odometer and/or one or more inclinometers.

* * * * *